Dec. 25, 1928.   1,696,248
E. R. MORTON
CIRCUITS FOR SYNCHRONOUS MOTORS
Filed April 6, 1927
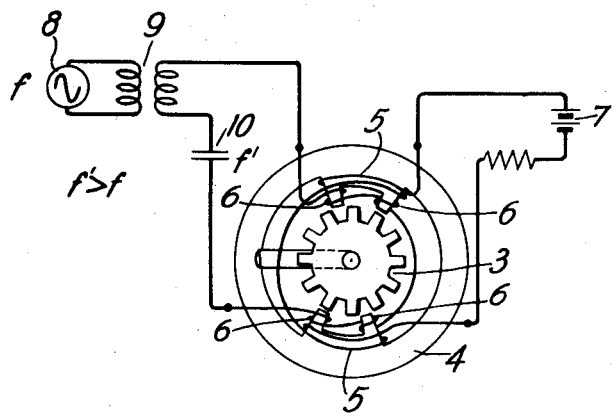
INVENTOR:
EDMUND R. MORTON
BY E. W. Griggs
ATTORNEY Patented Dec. 25, 1928.

1,696,248

UNITED STATES PATENT OFFICE.

EDMUND R. MORTON, OF BROOKLYN, NEW YORK, ASSIGNOR TO BELL TELEPHONE LABORATORIES, INCORPORATED, OF NEW YORK, N. Y., A CORPORATION OF NEW YORK.

CIRCUITS FOR SYNCHRONOUS MOTORS.

Application filed April 6, 1927. Serial No. 181,324.

This invention relates to synchronous motor devices, and particularly to circuits for preventing hunting in synchronous motors of the inductor type.

Variations in load or power supply often tend to cause a synchronous motor to hunt or oscillate, which action is undesirable especially when the motor is being used to obtain constant speed operation.

In a specific preferred embodiment of this invention a synchronous motor of the inductor type is prevented from hunting by connecting in series with its armature winding a condenser of such value as to tune the armature circuit to a frequency above the frequency of the current supplied to the motor. For the best results the circuit should be so designed that ordinary fluctuations in operating conditions will not vary the instantaneous frequency of the counter electromotive force of the motor to such an extent that it will not lie on the steeply rising portion of the resonance curve. Generally, the most convenient operating condition will be obtained by making the normal current approximately one-half the resonant current, although this value is not critical and good operation may be obtained with capacities varying considerably from this value.

The invention can be more readily understood by reference to the following detailed description in connection with the drawing which shows one embodiment thereof.

There is shown diagrammatically an inductor type synchronous motor comprising a rotatable inductor 3, and a stator or armature structure 4 on which are mounted field windings 5, 5 and armature windings 6, 6. Direct current is supplied to the field windings 5, 5 from the battery 7 and alternating current is supplied to the armature windings 6, 6 from a source 8 through a transformer 9. In order to prevent the motor from hunting, a condenser 10 is connected in series with the armature windings 6, 6. The capacity of this condenser is such as to tune the armature circuit to a frequency $f'$ higher than the frequency $f$ of the wave supplied by the source 7, giving the circuit a capacity reactance. The capacity of the condenser should be sufficiently large as not to excessively increase the impedance of the circuit. As pointed out above, good operation is obtained when the capacity of the condenser 9 is such that the armature current is about half the resonant current of the circuit.

What is claimed is:

1. A synchronous motor system in which hunting is substantially absent, comprising means in series with the motor armature for tuning the armature circuit to a frequency above the frequency of the current supplied thereto and prevent hunting action, said means serving to give the armature circuit a capacitative reactance at the supply frequency.

2. In combination, an electromagnetic device having a moving member, a circuit including a current source for setting up a periodically varying field to impulse said moving member at the periodicity of the field variations to maintain the member in regular motion, and means for preventing said moving member from changing its motion due to external causes to such an extent as to cause the field to temporarily or permanently lose control of the moving member, said last mentioned means taking the form of impedance means in series with said circuit for tuning it to a periodicity above the periodicity of said source to have a much smaller reactance to a certain frequency range above the frequency of the periodic variations of the supply circuit than to a neighboring lower frequency range and for maintaining said reactance capacitative.

3. In combination, a synchronous motor having an armature winding and means for tuning said winding circuit to a frequency above the frequency of the current supplied thereto, to prevent hunting, said means comprising a condenser connected in series with the winding.

4. A combination according to the preceding claim in which the capacity of the condenser is such that motor operates on the steeply rising portion of the resonance curve.

5. A combination according to claim 2 in which the capacity of the condenser is such that the normal current flowing in the armature circuit is approximately one-half the resonant current of the circuit.

6. In combination a synchronous motor of the inductor type having an armature winding, and a condenser connected in series with said winding, the capacity of said condenser being such as to tune the winding circuit to such a frequency that the motor operates on the steeply rising portion of the resonance curve, to prevent hunting.

7. A combination according to the preceding claim in which the capacity of the condenser is such as to give the circuit a capacity impedance approximately twice the resonant impedance of the circuit at the frequency of the current supplied to the winding.

8. A system comprising a synchronous motor having an armature winding, and means for tuning the armature circuit to a frequency above the frequency of the supplied current to prevent hunting action, said means serving to effect operation of the motor on the steeply rising portion of the resonance curve.

In witness whereof, I hereunto subscribe my name this 1st day of April, A. D. 1927.

EDMUND R. MORTON.